United States Patent [19]

Beitel

[11] Patent Number: 4,752,517

[45] Date of Patent: Jun. 21, 1988

[54] METHOD OF INTERCONNECTING A PANEL EDGE MEMBER TO PANEL PORTIONS

[75] Inventor: Otto Beitel, Edmonton, Canada

[73] Assignee: Otto Fastening Systems, Ltd., Edmonton, Canada

[21] Appl. No.: 914,914

[22] Filed: Oct. 2, 1986

[51] Int. Cl.[4] .......... B32B 3/02; B32B 7/04

[52] U.S. Cl. .......... 428/122; 49/501; 52/716; 52/823; 156/70; 428/192; 428/358

[58] Field of Search .......... 49/501; 52/823, 716; 156/70; 428/122, 192, 358

[56] References Cited

U.S. PATENT DOCUMENTS

| | | | |
|---|---|---|---|
| 3,750,333 | 8/1973 | Vance | 49/501 |
| 3,834,101 | 9/1974 | Wilder et al. | 52/823 X |
| 4,114,319 | 9/1978 | Governale | 49/501 X |
| 4,120,998 | 10/1978 | Olez | 428/188 X |
| 4,154,880 | 5/1979 | Drennan | 428/100 X |
| 4,601,149 | 7/1986 | Dokan | 428/100 X |
| 4,636,421 | 1/1987 | Hotovy | 428/122 X |
| 4,668,556 | 5/1987 | Hermann et al. | 428/122 |

*Primary Examiner*—Henry F. Epstein
*Attorney, Agent, or Firm*—D. Peter Hochberg; Mark M. Kusner; Walter C. Danison, Jr.

[57] ABSTRACT

A method of interconnecting a panel edge to a structural member with an adhesive which will only bond to the panel material comprises positioning the panel edge in a groove of the structural member which is filled with the adhesive. The groove has converging opposing surfaces towards the groove entrance which defines an enlarged cavity beneath the groove entrance. The adhesive, when it hardens, is securely bonded to the panel and forms an interlock between the panel and the converging surfaces of the groove to interconnected securely the panel to the structural member.

16 Claims, 2 Drawing Sheets

FIG.3.
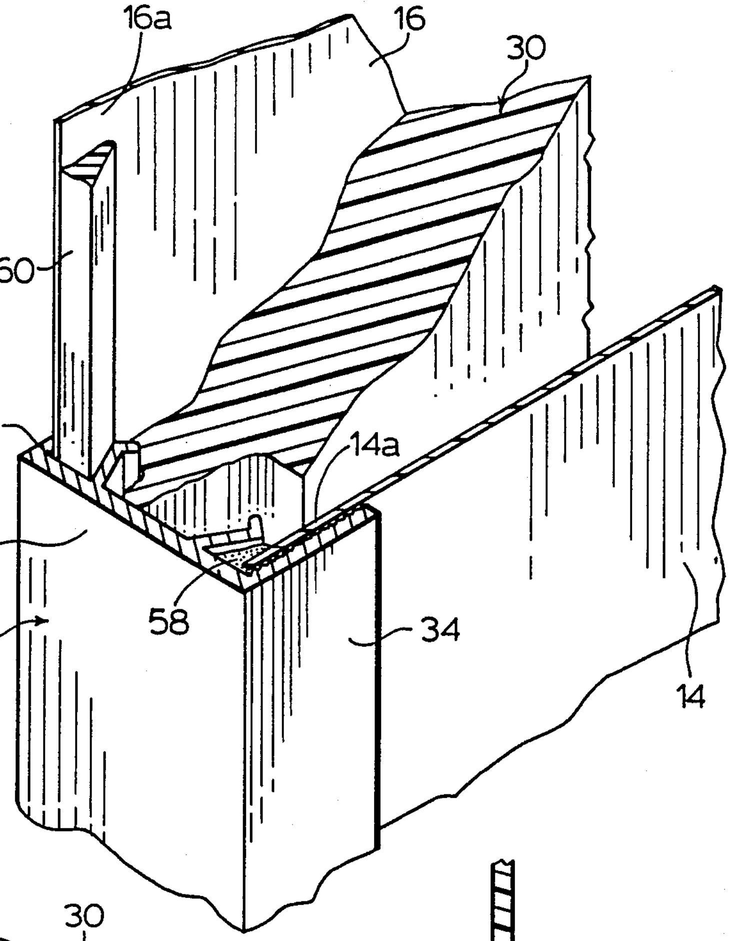
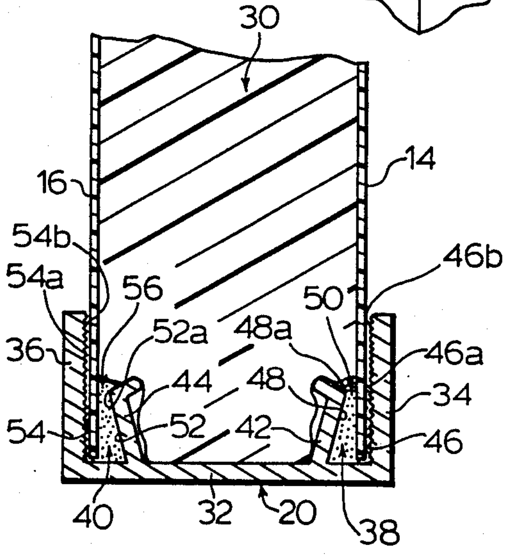
FIG.4.
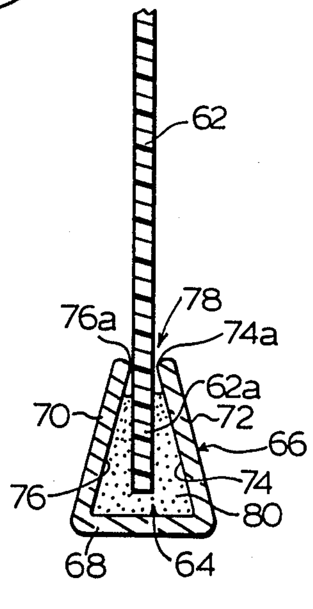
FIG.5.

METHOD OF INTERCONNECTING A PANEL EDGE MEMBER TO PANEL PORTIONS

FIELD OF THE INVENTION

This invention relates to a process for interconnecting a panel member to a structural member by use of an adhesive which will only bond to the material of the panel member.

BACKGROUND OF THE INVENTION

There are a variety of assemblies which involves connecting edge portions of various types of panel members to protective end caps, decorative trim or panel connectors and the like. Quite often the material for the panel is different from the material used in the connector end cap trim and the like. Rivets or other forms of connectors, such as screws, are used to interconnect the materials, because usually there is not an adhesive available which will bond the different materials together. For example, there are situations where it is desired to interconnect a plastic panel to a metal end cap. It is difficult, if not impossible, to locate an adhesive which is capable of bonding these two types of materials together. Hence in the past, they have been interconnected by screws, rivets and other mechanical fasteners. A common application for such construction is in the manufacture of panel doors, sliding doors, suspending of plastic panels, etc.

There are commercially available adhesives which bond very well to plastics commonly used in panels having the above noted applications. However, such adhesives do not form secure bonds, or do not bond at all to metals and the like used to finish edges of panels.

As a result, such as in door construction, means including mechanical fasteners and other approaches have been devised to effect a bonding between plastic or metal panels and end cap components. For example, in U.S. Pat. No. 3,750,333, a metal face door with a foam filled core has an extruded plastic end cap member. The steel panels have inwardly directed legs at their ends to provide ledges against which the extruded plastic end cap may be fitted. This type of construction avoids the need for an adhesive. Once the core of the door is filled with foam, the structure is rigidified. In U.S. Pat. No. 4,114,319, a metal skinned door is provided with a neoprene bottom edge portion. The neoprene bottom edge is positioned between the metal skins and held in place by foaming the core between the metal skins. The neoprene end cap has inwardly directed edge portions which anchor the end cap once the foam material becomes rigid. Again, adhesives are not used in view of the unavailability of an adhesive which could contact the neoprene to the metal skin.

SUMMARY OF THE INVENTION

The invention is directed to interconnecting an edge portion of a panel to a structural member. The panel is made of a material which is different from a material for the structural member. The structural member has a groove defined by opposing wall portions of the structural member. The opposing wall portions have opposing edge portions which define an entrance to the groove. The opposing wall portions converge in a direction towards the entrance to define an enlarged cavity beneath the entrance. The entrance is of a width to receive the panel edge portion and permit insertion of the panel edge portion into the enlarged cavity.

According to an aspect of the invention, the process comprises filling a substantial portion of the enlarged cavity with a flowable resin which hardens upon curing. The resin is selected to be compatible with the panel material and forms a secure bond therewith when the resin has cured. Selected resin is incompatible with structural member material and thereby forms an insecure bond therewith. The panel edge portion is inserted through the entrance and into the flowable resin in the cavity. The resin is cured to form a secure bond with the panel material. The cured hardened resin interlocks between the panel edge portion and at least one of the opposing wall portions whereby the panel edge portion is securely interconnected to the structural member.

According to another aspect of the invention, an interconnection assembly is provided for interconnecting a panel edge portion to a structural member. The panel is made of a material which is different from a material for the structural member. The structural member has a groove defined by opposing wall portions of the structural member. The opposing wall portions have opposing edge portions which define an entrance to the groove. The opposing wall portions converge in a direction towards the entrance to define an enlarged cavity beneath the entrance. The entrance has a width wider than the panel thickness. The panel edge portion is positioned in the cavity between the opposing walls. A hardened resin, which is securely bonded to the panel material, fills a substantial portion of the cavity. The hardened resin is unbonded to the structural member material and is interlocked between the panel edge portion and at least one of the opposing walls whereby the panel edge portion is securely interconnected to the structural member.

BRIEF DESCRIPTION OF THE DRAWINGS

Preferred embodiments of the invention are shown in the drawings wherein:

FIG. 3 is a cut-away section of the door of FIG. 2;

FIG. 4 is a plane view of a cross-section through the door edge; and

FIG. 5 is a section of a door constructions according to another embodiment of the invention.

DETAIL DESCRIPTION OF THE PREFERRED EMBODIMENTS

Figure 1:
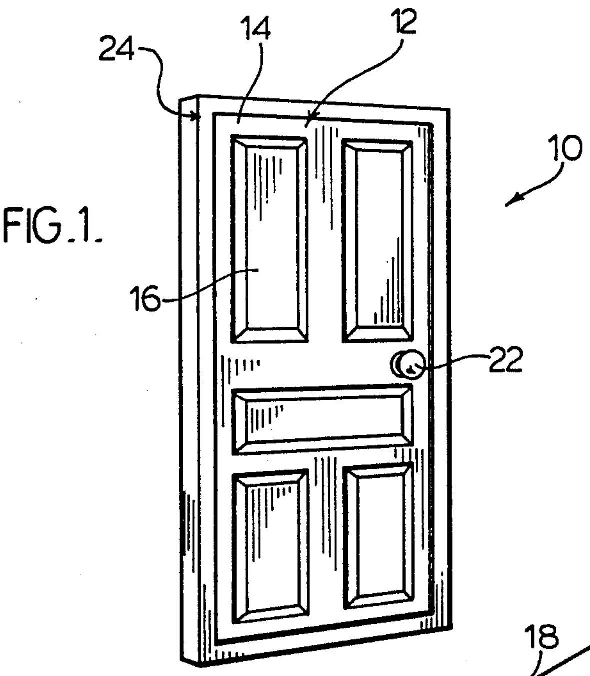
FIG. 1 is a perspective view of a representative type of door in which the invention is employed.
Figure 2:
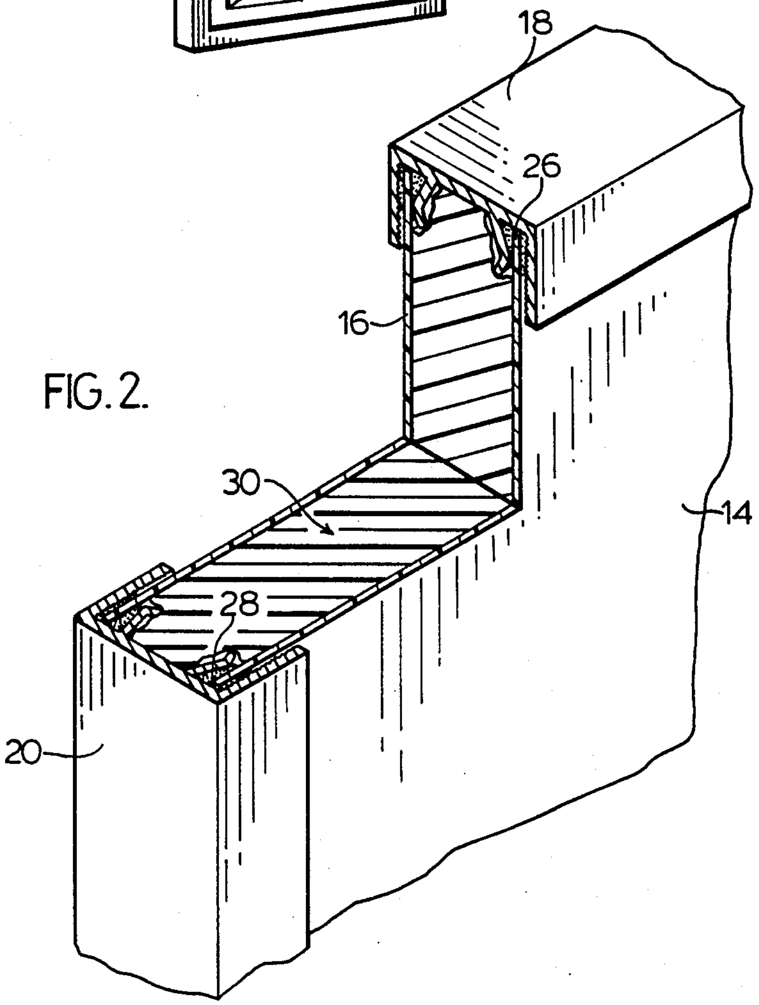
FIG. 2 is a perspective view of a door corner with a portion thereof removed to show the internal construction.

FIG. 1 embodies a typical application of the invention. A door construction 10 is shown having a door 12 with plastic opposing sides 14 and 16, as shown in FIG. 2. Each side may have decorative moldings formed therein such as at 16. End caps 18 and 20 are provided on the door as shown in FIG. 2. Various door hardware may be mounted on the end caps, such as hinges and a door bolt which is connected to the door handle 22. In accordance with standard procedure, the door may be fitted to a door frame 24, such that when delivered to the place of installation, it is ready for attachment to the framed in door openings.

As shown in FIG. 2, the end caps 18 and 20 are interconnected to the opposing panels 14 and 16. According to this preferred embodiment, the panels 14 and 16 are of a selected plastic, whereas the end caps 18 and 20 are of a selected metal. According to this invention, an interconnection is provided for securely connecting edge portions 26 and 28 of panel 14 and similarly edge portions of panel 16 to the end caps 18 and 20. It is appreciated that a variety of suitable plastics are useful in forming the panels for the door. For example, the plastics may be of polyester or acrylic resins, polyvinyl chloride or polyolefins, such as polyethylene or polypropylene. There are a variety of metals available for use in forming the end caps. Such metals may include aluminum alloys and steel alloys. The desired cross-sectional configuration can be formed in the end caps by either rolling the selected steel or extruding the aluminum material. The importance of the particular configurations of the end caps will be discussed with respect to FIGS. 3 and 4. Once the panels 14 and 16 are secured to the door end caps 18 and 20, the core of the door is filled with a foam material 30 to rigidify the structure while at the same time providing sound dampening and insulative properties.

It is appreciated that other materials are, of course, available and used in door and other types of building component construction. For example, with the door of FIG. 2, the end caps may be formed of materials other than metal, such as other types of plastics which are different from the plastics used in forming the side panels. Wood may also form the end caps where the desired configuration is milled into the wood construction.

With reference to FIGS. 3 and 4, the end cap 20, which is the same in profile as end cap 18, may be formed by extruding a suitable aluminum alloy. The end cap has a base portion 32 with upright side walls 34 and 36. In order to define grooves generally designated 38 and 40 into which the panels 14 and 16 are respectively inserted, upright legs 42 and 44 are provided on the base 32. The cavity of groove 38 is, therefore, defined by opposing walls 46 and 48. An entrance 50 is provided for the groove 38 and is defined by the upper opposing edges **46*a* and 48*a* of the wall portions 46 and 48. The wall portions 46 and 48 converge in a direction towards the entrance 50 to thereby define an enlarged cavity beneath the entrance 50**.

Similarly with groove 40, the cavity thereof is defined by opposing wall portions 52 and 54. The entrance 56 to the groove is defined by the opposing upper edges **52*a* and 54*a* of the opposing wall portions. The opposing walls 52 and 54 converge in a direction towards the entrance 56 to define the enlarged cavity beneath the entrance 56**.

According to this preferred embodiment, the end cap 20 is formed from extruded aluminum, where the extrusion die defines the cross-sectional shape shown in FIG. 4. It is appreciated, however, that the end cap 20 may be cast aluminum or of other metals such as various steel alloys and stainless steel, copper, bronze and the like. When formed from steel, the configuration can be roll formed to provide the desired shape for the enlarged cavities which receive the panels 14 and 16.

The adhesive used to interlock the panel in the end cap is only compatible with the material of the panels and is not compatible with the material of the end cap. As noted in instances where the panels 14 and 16 are formed from plastic material, such as polyester or acrylic resin, there are several commercially available resins which when cured and hardened will bond securely to the polyester or acrylic resins of the panels. However, those commercially available adhesive resins do not bond at the same time to the metal of the end cap. According to this invention, the cavities are configured such that when the adhesive hardens, an interlocking action is achieved. With reference to FIG. 4, a substantial portion of the cavities 38 and 40 are filled with a suitable adhesive resin. The end portions **14*a* or 16*a*, as shown in FIG. 3, are then inserted into the grooves through the entrances 50 and 56 and into the resins 58 and 60. The resin is then allowed to harden by curing, which can be caused by a drying process, application of heat or application of electromagnetic energy such as UV curing. When the resin hardens, there is a firm secure bond of the resin to the respective panel end portions 14*a* and 16*a*. Due to the opposing wall portions of each groove 38 and 40 converging towards the respective entrance, the hardened resin, even though it does not bond to the metal of the end cap, interlocks the panel edge within the groove. As a result, the respective end portions of the panels cannot be withdrawn from the respective grooves. The hardened resin, as securely bonded to the panels, is trapped within the enlarged cavity of the respective groove. Due to the rigidity of the opposing wall portions, the entrance is not allowed to spring open to permit removal of the hardened resin from within the enlarged cavity. The end portions 14*a* and 16*a*** of the panels are trapped in the grooves to effect a secure interconnection of the panel end portion to the end cap. Hence, in accordance with the method of this invention, a secure interconnection of panel portions to structural components such as the end cap is achieved without the requirement of using an adhesive which is bondable to the material of the panel and not bondable to the material of the structural member.

It is appreciated that various types of adhesives are suitable for this application depending upon the material from which the panel is made. For example, thermoplastic or thermosetting adhesives may be used. If the panels are formed of a polyester or acrylic resin, then suitable acrylate resins may be used as the adhesive.

It is appreciated that the invention is equally applicable to constructions where the panels may be formed of metal and the end caps of plastic. The important aspect of the invention is that an adhesive is employed which will bond securely to the panel edge portion to effect an interlock with the groove of the structural member.

FIG. 5 exemplifies another embodiment of the invention which connects a single panel to a piece of edge trim. A plastic panel 62 has its end portion **62*a* inserted within a groove 64 defined within a structural member 66. Structural member 66 has a base portion 68 with upright side walls 70 and 72. Side walls 66 and 70 present opposing surfaces 74 and 76 which converge towards the entrance 78 of the groove 64. The entrance 78 is defined by opposing edge portions 74*a* and 76*a* of the surfaces 74 and 76. A suitable adhesive resin 80 is injected into the enlarged cavity of the groove 64 to fill a substantial portion of the groove. The end portion 62*a* of the panel is inserted into the cavity through the entrance 78 and is embedded in the adhesive resin 80. The resin is cured to harden at which point a secure bond is formed with the material of the panel 62. With the resin hardened, it is trapped in the cavity of the structural member 66 so that the end portion 62*a* is interlocked with the structural member by way of the hardened resin 80. It is appreciated that a metered amount of resin should be injected into the groove of the structural member 66 such that when the end portion 62*a*** of the panel is inserted in the groove, it does not cause the resin to overflow the cavity and produce unsightly adhesive markings on the panel exterior of the structural member. However if this does occur, it is appreciated that suitable solvents or the like can be used to remove the excess adhesive.

It is appreciated that a variety of shapes for the groove in the structural member may be used, the essential feature being that the opposing walls of the groove converge towards the entrance. The cross-sectional shape of the groove may be triangular, such as that shown in FIGS. 4 and 5. One or more of the opposing side walls may include serrated teeth, such as shown in FIG. 4 at 46*b* and 54*b*. Configurations other than triangular are also suitable, such as opposing wall portions which are curved or even constitute a circular shape in cross-section.

According to an aspect of the method of this invention, an interconnection is provided for connecting panels which may be of plastic material, such as polyester, acrylic or polyvinyl chloride, or a variety of polyolefins including polyethylene and polypropylene to a variety of end caps which may be of metal or other materials including plastics which are different from the plastics used in the panels. Commercially available adhesives may be used which readily bond to the material of the panel to form in a quick inexpensive manner for foming suitable interconnections.

Although preferred embodiments of the invention have been described herein in detail, it will be understood by those skilled in the art that variations may be made thereto without departing from the spirit of the invention or the scope of the appended claims.

The embodiments of the invention in which an exclusive property or privilege is claimed are defined as follows:

1. A method of interconnecting an edge portion of a panel to a structural member, said panel being made of a material which is different from a material for said structural member, said structural member having a groove defined by opposing wall portions of said structural member, said opposing wall portions having opposing edge portions which define an entrance to said groove, said opposing wall portions converging in a direction towards said entrance to define an enlarged cavity beneath said entrance, said entrance being of a width to receive said panel edge portion and permit insertion of said panel edge portion into said enlarged cavity, said process comprising filling a substantial portion of said enlarged cavity with a flowable resin which hardens upon curing, said resin being selected to be compatible with said panel material and forms a secure bond therewith when said resin has cured, said selected resin being incompatible with said structural member material and thereby forms an insecure bond therewith, inserting said panel edge portion through said entrance and into said flowable resin in said cavity, curing said resin to form a secure bond with said panel material, said cured hardened resin interlocking between said panel edge portion and at least one of said opposing wall portions whereby said panel edge portion is securely interconnected to said structural member.

2. A method of claim 1, wherein sufficient resin is placed in said enlarged cavity to ensure said enlarged cavity is essentially filled with cured resin after said panel edge is inserted into said enlarged cavity.

3. A method of claim 1, wherein said groove extends along said panel edge portion for its entire length.

4. A method of claim 1, wherein said resin envelopes said panel edge portion to interlock said panel edge portion between both opposing wall portions of said cavity.

5. A method of claim 1, wherein said panel material is a selected plastic and said structural member material is a selected metal.

6. A method of claim 5, wherein said selected plastic is a polyester, an acrylic, a polyvinyl chloride or a polyolefin.

7. A method of claim 5, wherein said selected metal is a steel or an aluminum alloy.

8. A method of claim 7, wherein said selected metal is an aluminum alloy, said structural member being extruded from said aluminum alloy with said cavity opposing walls formed therein along its length.

9. A method of claim 8, wherein said selected plastic is a polyester or an acrylic, said curable resin being an acrylate resin.

10. A method of claim 1, wherein said curable resin is a thermoplastic or a thermosetting resin.

11. An interconnection assembly for interconnecting a panel edge portion to a structural member, said panel being made of a material which is different from a material for said structural member, said structural member having a groove defined by opposing wall portions of said structural member, said opposing wall portions having opposing edge portions which define an entrance to said groove, said opposing wall portions converging in a direction towards said entrance to define an enlarged cavity beneath said entrance, said entrance having a width wider than said panel thickness, said panel edge portion being positioned in said cavity between said opposing walls, a hardened resin which is securely bonded to said panel material filling a substantial portion of said cavity, said hardened resin being unbonded to said structural member material and interlocked between said panel edge portion and at least one of said opposing walls whereby said panel edge portion is securely interconnected to said structural member.

12. An interconnection assembly of claim 11, wherein said hardened resin envelopes said panel edge portion to interlock said panel edge portion between opposing wall portions of said cavity.

13. An interconnection assembly of claim 11, wherein said structural member is of a selected metal and said panel is of a selected plastic.

14. An interconnection assembly of claim 11, wherein said structural member is an extruded end cap for said panel edge with said opposing walls of said groove extruded therein, said plastic panel being of a polyester or acrylic material.

15. An interconnection assembly of claim 14, wherein at least one of said opposing walls has serrated teeth along its length.

16. An interconnection assembly of claim 14, wherein said opposing walls have essentially planar surfaces, said enlarged cavity being essentially triangular shaped in cross-section.

* * * * *